J. L. CROOKER.
DIRIGIBLE HEADLIGHTS.
APPLICATION FILED APR. 13, 1914.
1,173,649.
Patented Feb. 29, 1916.
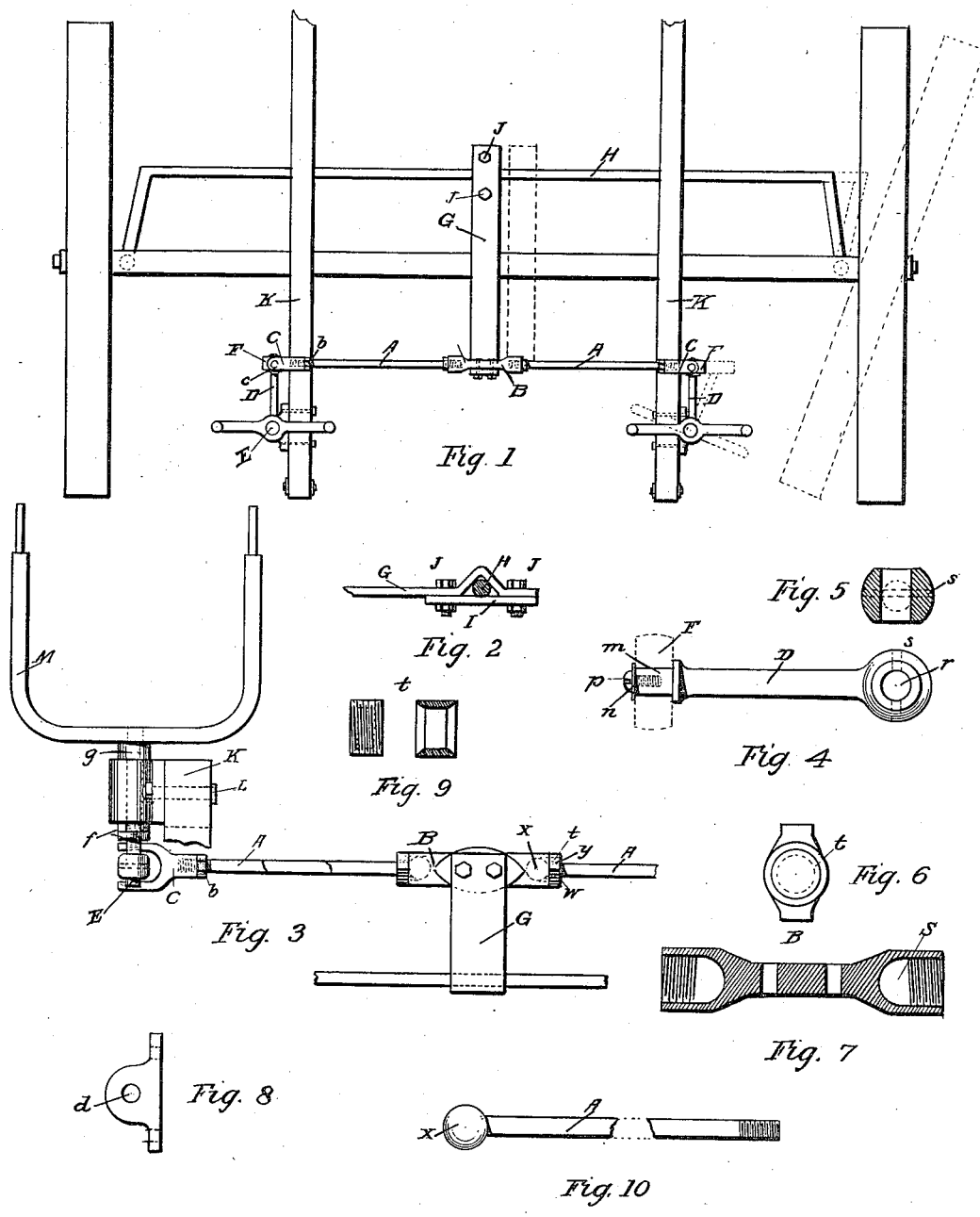

UNITED STATES PATENT OFFICE.

JOHN L. CROOKER, OF BOISE, IDAHO.

DIRIGIBLE HEADLIGHTS.

1,173,649.  Specification of Letters Patent.  Patented Feb. 29, 1916.

Application filed April 13, 1914. Serial No. 831,558.

*To all whom it may concern:*

Be it known that I, JOHN L. CROOKER, a citizen of the United States, residing at Boise, in the county of Ada, State of Idaho, have invented new and useful Dirigible Headlights for Automobiles, of which the following is a specification.

My invention relates to improvements in adjusting the headlights on automobiles by which the light from the headlights falls directly in the path of the front wheels of the automobile regardless of the direction in which the automobile may be traveling, and the objects of my improvements are: First: To provide a convenient and strong mechanism to automatically adjust headlights on automobiles so that the headlights will revolve from right to left and vice versa to accord with the direction the automobile is traveling. Second: To reduce the friction of the dirigible headlights in order that said headlights may be adjusted without interfering with the operation of the steering rod of the automobile and at the same time provide a mechanism to respond to the action of the steering rod and also to the changing position of the springs of the automobile. I attain these objects by the mechanism illustrated in the accompanying drawing in which—

Figure 1 is a top view of the front part of the automobile stripped, showing the dirigible headlights in position. Fig. 2 is the connection of the bar of the dirigible headlights with the steering rod of the automobile. Fig. 3 is a part front view of the dirigible headlights connected with the automobile. Fig. 4 is the connecting arm of the dirigible headlights with the automobile lamp holder. Fig. 5 is a horizontal section through the center of the head of the connecting arm. Fig. 6 is an end view of the center connecting piece. Fig. 7 is a horizontal longitudinal section through the center of the said connecting piece. Fig. 8 is a top view of the bracket carrying the lamp frame. Fig. 9 is a view and a section of the stop ring indicated by a dotted line on Fig. 6. Fig. 10 is a front view of the main rod A.

Similar letters refer to similar parts throughout the several views.

The connecting bar G, the center piece B, two main rods A, two end pieces C, two circular pieces F, the two arms D, the pivot E connected with the frame that holds the lamps in the bracket constitute the frame work of the mechanism.

The two main rods A consist of rods of sufficient length when connected with B and C to reach just beyond the outer edge of the front springs of an automobile, see Fig. 1. In Fig. 10 I have shown the rods A as having a threaded end and a ball provided on the opposite end. The center piece B (see Fig. 1 and Fig. 7) is a short piece with a socket S (see Fig. 7) in each end, the inside of said sockets being threaded. The bar G (see Fig. 1 and Fig. 3) is a flat piece extending from the steering rod of the automobile to the center piece B. The two end parts C consist of a forked piece with a threaded aperture in one end and two jaws with a hole in each on the opposite end (see Fig. 3). The two parts F consist of circular pieces which are held in place by screws that pass through the jaws of C and containing an aperture through which the one end of D passes and forms a universal knuckle joint at the point "C" (see Fig. 4). The two arms D consist of short pieces extending from where D connects with C and form a universal knuckle joint to E, the pivot upon which the lamp frame is attached. This end of the arm D is circular and contains an aperture "r" through which the end of E extends and is clenched by a clench pin which extends through the head of D at "s".

E (Fig. 3) is the pivot which passes through the bracket at "d" Fig. 8 bolted on to the automobile springs K and is clenched firmly to M by a clench pin which passes through M and E.

M is the frame which holds the automobile lamps.

H is the steering rod of the automobile.

I is the piece that is fastened on the steering rod with G.

J is the bolt that clamps G and I to H.

K, part of automobile spring showing the bracket Fig. 8 attached thereto.

L, bolts which attach the bracket Fig. 8 to the automobile springs.

G is clamped firmly to H at the middle point of H by means of the curve in the end of G which passes over the top of H and is bolted to I by means of two bolts which pass through G and I and are fastened by lock nuts (see Fig. 2 and Fig. 3). G extends from H forward and is turned slightly upward and passes over the front axle of the automobile to the center piece B where it is bent up and is attached firmly to B by two bolts (see Fig. 1 and Fig. 3).

In each end of the center piece B is a socket S (see Fig. 7 and Fig. 3) the inside of each socket containing threads and into these sockets fits the ball $x$ on the end of the main rods A, leaving sufficient play for A to move about in a rotary motion. After the ball end $x$ of main rod A is placed in the socket S (see Fig. 3) and ring "$t$" with threads on the outer side and reamed on both ends (Fig. 9) is screwed into B and fits snugly against "$x$" leaving a space "$y$" Fig. 3 for the play of rod A when moved and when in place a lock nut W is placed on "$t$" and holds it firmly in place forming what is known as a universal ball joint. The opposite end of the main rod A contains threads and is screwed into an aperture in the end of C and locked by lock nut $b$ (see Fig. 1 and Fig. 3. The opposite end of C contains two jaws with an aperture in each through which two screws pass and are set firmly in F (Fig. 1) allowing the jaws of C to move freely about these two screws from right to left and vice versa. Through F there is an aperture "$m$" through which one end of D passes (see Fig. 4 and Fig. 1) and is held in place by the shoulder of D and the bolt "$p$" and washer "$n$" in the end of arm D (Fig. 4) forming a universal knuckle joint at "$c$". The opposite end of arm D is circular and contains an aperture "$r$" through which the lower end of pivot E passes and is clenched firmly in D by clench pin "$s$" (see Fig. 4 and Fig. 5).

E passes through "$d$" the aperture in Fig. 8 and through aperture in M and is clenched firmly by clench pin in M (see Fig. 3). The aperture "$d$" in Fig. 8 is made sufficiently large to permit E to revolve freely from right to left and vice versa, and two lock nuts "$f$" are screwed on E just under and snugly against the bottom of bracket shown in Fig. 8 (see Fig. 3) and a collar ring "$g$" is placed around E on the top side of said bracket in order to hold lamp in place.

The object of the combination of the arms and joints and the respective parts in the manner herein indicated give absolute freedom for the machine to operate as well when the automobile is springing up and down as when the automobile is normal.

The universal ball joint, as herein indicated, permits A to revolve in a rotary manner, while the knuckle joint at "$c$" as hereinbefore described permits the arm D to move from right to left and vice versa while D has a rotary motion at C, the combination of the two joints producing freedom and uniformity in the adjusting of the lamps without in any way affecting the operating of the automobile.

The dotted lines in Fig. 1 show the relative position of the mechanism when the automobile has changed its position in turning to the right.

I am not aware that prior to my invention any mechanism has been made to adjust headlights on automobiles with a combination of the universal ball joint and the universal knuckle joint with the rods A, bar G, center piece B and arms D connected to the pivot E, as hereinbefore described.

I claim:

In combination with the frame and steering rod of an automobile, a connecting rod having one end thereof secured to the steering rod, a center piece supported by the opposite end of the connecting rod, said center piece having a socket in each end thereof, main rods, one end of each main rod having an integral ball, said balls being positioned in the sockets of the center piece, end pieces connected to the main rods, lamp brackets supported on the frame, and means for connecting the end pieces to the lamp bracket, whereby movement of the steering rod produces a relative movement of the bracket.

JOHN L. CROOKER.

Witnesses:
 MATTHEW BEGLAN,
 G. L. BUHR.